(12) United States Patent
Pastorina et al.

(10) Patent No.: US 9,444,338 B1
(45) Date of Patent: Sep. 13, 2016

(54) SYSTEMS AND METHODS TO CALIBRATE SWITCHING REGULATORS

(71) Applicant: Maxim Integrated Products, Inc., San Jose, CA (US)

(72) Inventors: Salvatore Giovanni Pastorina, Catania (IT); Antonio Magazzu', Messina (IT); Antonio Panebianco, Aci S. Antonio (IT); Gaetano Maria Walter Petrina, Mascalucia (IT)

(73) Assignee: Maxim Integrated Products, Inc., San Jose, CA (US)

( * ) Notice: Subject to any disclaimer, the term of this patent is extended or adjusted under 35 U.S.C. 154(b) by 261 days.

(21) Appl. No.: 13/864,047

(22) Filed: Apr. 16, 2013

Related U.S. Application Data

(60) Provisional application No. 61/791,616, filed on Mar. 15, 2013.

(51) Int. Cl.
*H02M 3/157* (2006.01)
*G05F 1/10* (2006.01)
*H02M 1/00* (2006.01)

(52) U.S. Cl.
CPC .............. *H02M 3/157* (2013.01); *G05F 1/10* (2013.01); *H02M 2001/0029* (2013.01)

(58) Field of Classification Search
CPC ............... H02M 2001/0029; H02M 3/156; H02M 3/158; H02M 3/1588; H02M 2003/1566; H02M 3/155; H02M 3/157
USPC .......................... 323/282–283, 288
See application file for complete search history.

(56) References Cited

U.S. PATENT DOCUMENTS

| | | | | |
|---|---|---|---|---|
| 7,372,238 B1* | 5/2008 | Tomiyoshi | ..................... | 323/224 |
| 7,589,517 B1* | 9/2009 | Broach et al. | ............ | 324/117 R |
| 2004/0036459 A1* | 2/2004 | Wiktor et al. | ................ | 323/282 |
| 2007/0120547 A1* | 5/2007 | Tateishi et al. | ............... | 323/282 |
| 2007/0164720 A1* | 7/2007 | Lalithambika et al. | ....... | 323/288 |
| 2007/0296389 A1* | 12/2007 | Chen et al. | .................... | 323/290 |
| 2010/0001706 A1* | 1/2010 | Nguyen | ........................ | 323/288 |
| 2011/0050185 A1* | 3/2011 | Notman et al. | ............... | 323/271 |
| 2011/0101932 A1* | 5/2011 | Nakazono | ..................... | 323/271 |
| 2011/0115458 A1* | 5/2011 | Schafmeister et al. | ....... | 323/284 |
| 2014/0091774 A1* | 4/2014 | Srinivasan et al. | ........... | 323/271 |
| 2014/0266116 A1* | 9/2014 | Henzler et al. | ................ | 323/283 |

OTHER PUBLICATIONS

Kaplan, Wiley Electrical and Electronics Engineering Dictionary 2004, p. 717 definition of "slope".*

* cited by examiner

*Primary Examiner* — Gary L Laxton
*Assistant Examiner* — Kyle J Moody
(74) *Attorney, Agent, or Firm* — North Weber & Baugh LLP

(57) ABSTRACT

Various embodiments of the invention provide for a double measurement technique to enable auto-calibration of a switching regulator. In certain embodiments, calibration is performed using a digital conversion circuit that adjusts an internal slope of an on-time generator by adjusting the peak value of a ramp to a desired peak voltage value. Auto-calibration allows for an optimal dynamic response across the entire switching frequency range of the switching regulator even in noisy environments.

20 Claims, 6 Drawing Sheets

SYSTEMS AND METHODS TO CALIBRATE SWITCHING REGULATORS

CROSS REFERENCE TO RELATED PATENT APPLICATIONS

The present application claims priority to U.S. Provisional Application Ser. No. 61/791,616 titled "Systems and Methods to Calibrate Switching Regulators," filed on Mar. 15, 2013 by Salvatore Giovanni Pastorina, Antonio Magazzu, Antonio Panebianco, and Gaetano Maria Walter Petrina, which application is incorporated herein by reference in its entirety.

BACKGROUND

A. Technical Field

The present invention relates to switching regulators, and more particularly, to systems, devices, and methods of calibrating single-phase and multi-phase programmable frequency DC-DC converters.

B. Background of the Invention

Modern devices, such as CPUs for notebooks, desktops, and the server market require regulated supply voltages and currents that satisfy stringent specifications with regard to stability, undershoot voltage, response time, and accuracy. CPU supply voltages are oftentimes provided by a single or multi-phase step-down voltage regulator with programmable switching frequency. Switching frequency and on-time are almost always set through an external circuit component (e.g., a resistor) of unknown value, which is connected to an unknown input voltage that serves as the supply of a switch mode power supply.

Constant on-time or constant off-time pseudo-constant frequency type buck converter architectures typically operate in current mode control and contain an internal slope compensation circuit intended to improve mainly two circuit characteristics: noise immunity and stability. These slope compensation circuits generate a voltage ramp having a fixed slope that is typically optimized only for a limited range of switching frequencies, typically at the center of the programmable operating switching frequency range of the of the buck converter. In the most trivial case, the ramp is generated by a current that charges a capacitor.

Since adjusting on-time or off-time with a circuit component to set the switching frequency does not affect the constant slope of prior art compensation circuits, existing buck converters may exhibit inconsistencies in stability, phase margin, and noise immunity, especially at the upper and lower boundaries of the available switching frequency range.

Fixed-frequency topologies with a variable on-time, but constant period typically require no slope adjustment. However, such designs do not provide a viable technical alternative to applications requiring a fast response time.

SUMMARY OF THE INVENTION

Various embodiments of the invention allow to calibrate a switching regulator in a manner so as to maintain optimal dynamic response across the entire switching frequency range of the switching regulator, thereby, ensuring stability, phase margin, and noise immunity independent of switching frequency settings.

In certain embodiments of the invention, calibration is performed, at startup, by adjusting an internal slope of an on-time generator. The on-time generator forces a constant voltage on a terminal of a comparator to generate a pulse having a pulse width that is equivalent to the switching period during a normal mode of operation of the switching regulator. The on-time generator comprises a sample and hold circuit that, in combination with a combiner circuit, generates a charging current based on an unknown external resistor that is used to set the switching frequency of the regulator. The charging current is used to generate the constant voltage for the comparator.

In various embodiments, a voltage slope of a compensation ramp is calibrated by using a digital conversion circuit that adjusts the peak value of the ramp to a desired peak voltage value. In one embodiment, the conversion circuit adjusts the slope by combining an ADC, a logic device, and a current DAC. Some embodiments exploit a double measurement technique during auto-calibration to generate a switching period that is equal to a normal operation switching period set by an external resistor that is connected to an unknown voltage.

Certain features and advantages of the present invention have been generally described here; however, additional features, advantages, and embodiments are presented herein will be apparent to one of ordinary skill in the art in view of the drawings, specification, and claims hereof. Accordingly, it should be understood that the scope of the invention is not limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

This document discusses the invention mainly in terms of high bandwidth constant on-time DC-DC step-down voltage (buck) regulators having a programmable switching frequency that is typically set by an external circuit component. However, the invention can equally be applied to any other constant on-time or off-time architecture that comprises slope compensation recognized by one of skill in the art. The formulas presented herein will change accordingly.

Figure 1:
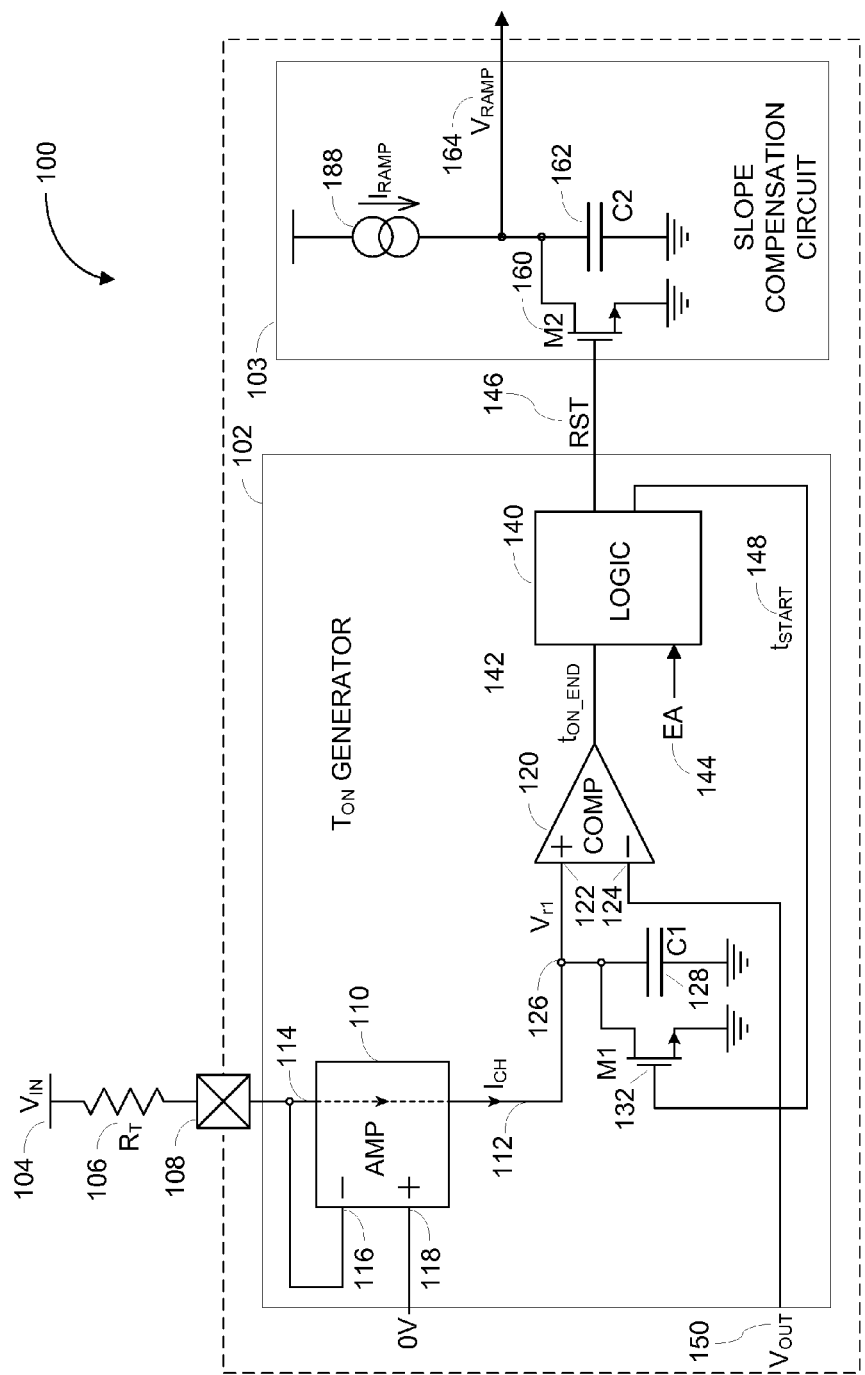
FIG. 1 shows a prior art programmable frequency DC-DC converter connected to an external resistor driven by an external voltage.

FIG. 1 shows a prior art programmable frequency DC-DC converter connected to an external resistor driven by an external voltage. Converter 100 comprises on-time pulse generator 102 and slope compensation ramp circuit 103.

On-time pulse generator 102 comprises amplifier 110, comparator 120, capacitor 128, switch 132, and logic device 140. The output of amplifier 110 is connected to external resistor $R_T$ 106 via pad 108. External resistor 106 is connected to unknown external voltage $V_{IN}$ 104. The values of $R_T$ and $V_{IN}$ are generally unknown and typically provided by the customer.

One terminal of external resistor $R_T$ is connected to pad 108. The output of amplifier 110 is connected to positive terminal 122 of comparator 120, while negative terminal 124 of comparator 120 is coupled to $V_{OUT}$ 150, which represents the voltage to be regulated by converter 100. One terminal of capacitor 128 is coupled to positive terminal 122 of comparator 120. The other terminal of capacitor 128 is coupled to ground potential. Switch 132 is a MOS device that is responsive to a signal from logic device 148. Logic device 140 comprises two input terminals to receive output signal $t_{ON\_END}$ 142 from comparator 120 and digital EA signal 144 from a control circuit (not shown). Logic device 140 further comprises two output terminals, one to output a reset pule signal RST 146, and one to output control signal $t_{START}$ 148 that controls MOS switch 132.

In operation, the constant on-time architecture of converter 100 generates a constant on-time $t_{ON}$ pulse that is proportional to the product of the value of external resistor $R_T$ 106 times the duty cycle D, i.e., $$t_{ON} \propto (R_T * D)$$

The on pulse causes generator 102 to operate at a pseudo-constant switching frequency, $f_{SW}$, that is inversely proportional to the value of external resistor $R_T$ 106, as expressed by $$f_{SW} \propto \left(\frac{1}{T_{SW}} \propto \frac{1}{R_T}\right)$$

In other words, selecting the value of external resistor $R_T$ 106 determines both the constant on-time $t_{ON}$ and the switching frequency $f_{SW}$. As can be seen form the above formulae, varying the value of $V_{IN}$ 104 will not vary the switching frequency $f_{SW}$, since $f_{SW}$ is only a function of $R_T$ 106. However, varying $V_{IN}$ 104 will affect the constant on-time $t_{ON}$ because the duty cycle D is also a function of $V_{IN}$ 104. Similarly, varying the value of $V_{OUT}$ 150 will not affect the switching frequency $f_{SW}$, but doing so will vary the value of $t_{ON}$. For example, as $V_{OUT}$ 150 increases, the ramp time and, thus, $t_{ON}$ will increase in this constant on-time architecture. The operation of converter 100, which satisfies the above formulas, is explained in detail next.

On-time pulse generator 102 comprises amplifier 110 that forces a voltage on pad 108. The resulting voltage across resistor $R_T$ 106 generates a charging current 112 proportional to input voltage $V_{IN}$ 104. Since voltage $V_{IN}$ 104 is unknown, the value of resistor $R_T$ 106 cannot be directly measured. Charging current 112 charges capacitor $C_1$ 128 and causes ramp voltage $V_{R1}$ 126 to be present across $C_1$ 128. Ramp voltage $V_{R1}$ 126 is applied to positive terminal 122 of comparator 120, while negative terminal 124 of comparator 120 receives the voltage to be regulated, $V_{OUT}$ 150. When both values at input terminals 122 and 124 are equal, i.e., ramp voltage $V_{R1}$ 126 reaches $V_{OUT}$ 150, comparator 120 will change the status of output signal $t_{ON\_END}$ 142 from a low value to a high value (e.g., 1) indicating the end of the on-time pulse.

The on-time $t_{ON}$ can be defined as the time from when ramp voltage $V_{R1}$ 126 begins to ramp from zero to the time when voltage $V_{R1}$ 126 reaches $V_{OUT}$ 150. The beginning of the ramping of voltage $V_{R1}$ 126 coincides with the triggering of signal EA 144 at the rising edge of the on-time pulse, while the end of the ramp of voltage $V_{R1}$ 126 coincides with output signal $t_{ON\_END}$ 142 going high at the falling edge of the on-time pulse. The generated pulse will have a duration equal to the desired on-time $t_{ON}$. As discussed previously, $t_{ON}$ will be proportional to the value of external resistor $R_T$ 106.

The output signal of comparator 120 is input to logic 140 together with digital EA signal 144. Each time signal EA 144 triggers logic circuit 140 on the rising edge of the on-time pulse, i.e., at the beginning of each switching period, $T_{SW}$ (e.g., each 1 μsec), logic circuit 140, upon detecting the change in status of signal 142 to a low value, resets the on pulse by turning off switch 132 to discharge capacitor $C_1$ 128. This resets the ramp voltage $V_{R1}$ 126 to its initial value, so that ramp voltage $V_{R1}$ 126 is free to ramp up again. Additionally, discharging capacitor $C_1$ 128 unbalances comparator 120 and causes comparator output signal $t_{ON\_END}$ 142 to assume the low value until voltage $V_{R1}$ 126 again reaches $V_{OUT}$ 150 in the following cycle.

Slope compensation circuit 103 typically consists of constant current source 188, which charges capacitor $C_2$ 162, and MOS switch $M_2$ 160. The current $I_{RAMP}$ provided by current source 188 generates ramp voltage $V_{RAMP}$ 164 across $C_2$ 162. $V_{RAMP}$ 164 serves as a slope compensation signal that may then be added to a control signal (not shown). At each rising-edge of on-time pulse signal, logic 148 generates relatively short pulse signal RST 146, which is sufficiently long in duration to enable switch 160 to turn on. Turning on switch 160 allows capacitor $C_2$ 162 to discharge to ground via switch 160 to reset $V_{RAMP}$ 164. Additionally, logic circuit 140 generates signal 148 to turn on switch $M_1$ 132 to allow capacitor $C_1$ 128 to discharge to ground.

Slope compensation voltage $V_{RAMP}$ 164 has a period equal to the switching period $T_{SW}$, i.e., the $V_{RAMP}$ is reset every switching period. The slope of the compensation ramp generated by circuit 103 is given by $$m_l = \frac{I_{RAMP}}{C_2}$$

i.e., circuit 103 generates a constant slope ramp. The peak of the voltage ramp $V_{RAMP}$ 126 is given by $$V_{pk} = m_l * T_{sw} = \frac{m_l}{k} = \frac{I_{RAMP} * R_t C_1}{C_2},$$

i.e., $V_{pk} \propto R_t$

The peak value $V_{PK}$ is, thus, a function of the switching period, $T_{SW}$. One result of the constant slope ramp is that each time the switching frequency is adjusted via external resistor $R_t$, the $V_{PK}$ changes as well. For example, setting a higher $R_T$ value in order to increase the $f_{SW}$, allows $V_{RAMP}$ to reach a higher peak voltage value prior to being reset, since the slope of the waveform remains constant.

Therefore, it would be desirable to automatically vary the slope for any desired switching frequency, such that the peak value of the ramp can be set to a constant value in order to maintain optimal circuit transient response characteristics, including stability and noise immunity performance throughout the entire frequency range, independent of switching frequency settings.

Figure 2:
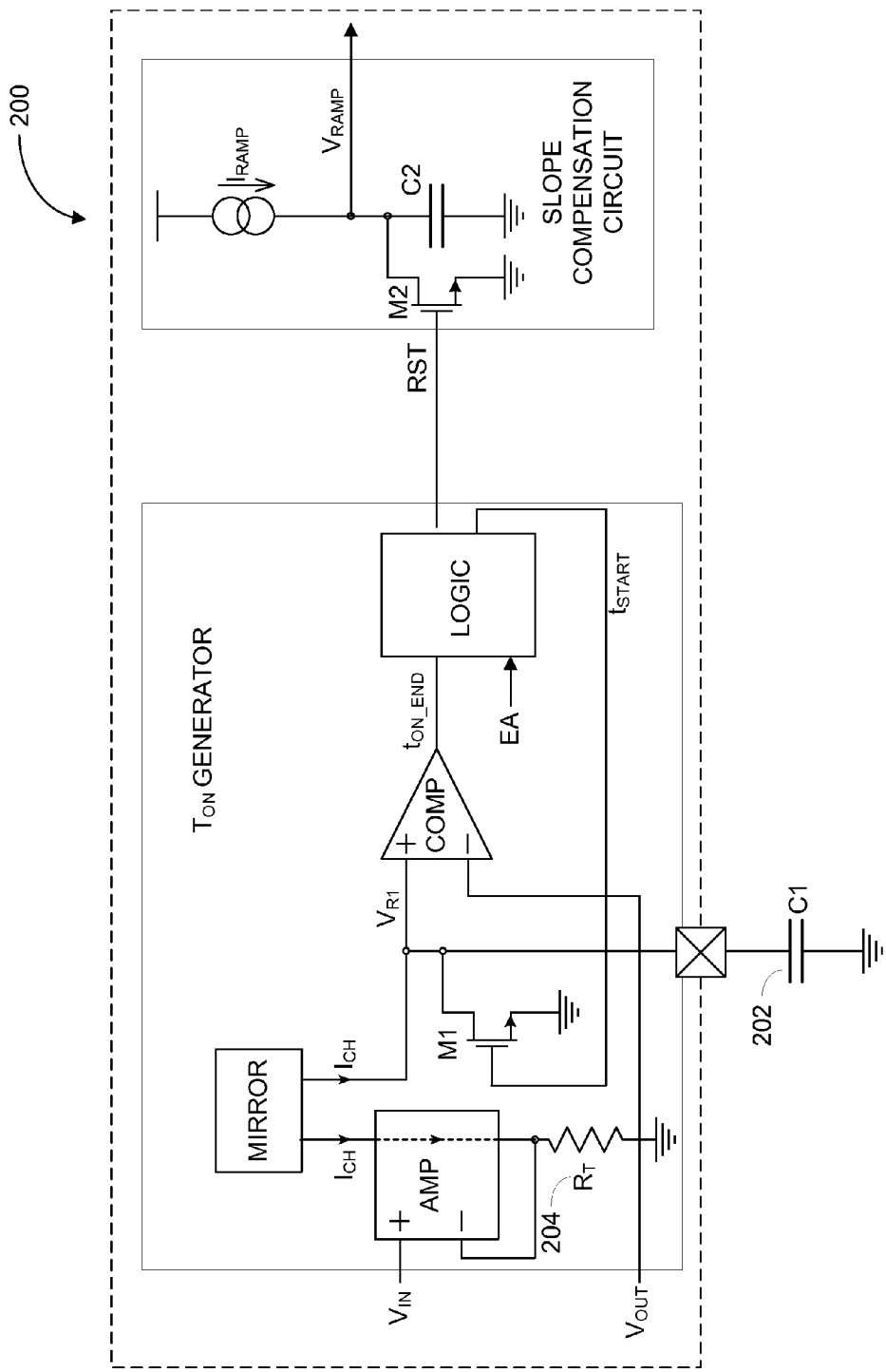
FIG. 2 shows a prior art programmable frequency DC-DC converter connected to a grounded external capacitor.

FIG. 2 shows a prior art programmable frequency DC-DC converter connected to a grounded external capacitor. Circuit 200 differs from the circuit in FIG. 1 in that the external resistor in FIG. 1 is replaced by external capacitor 202, which may be a variable capacitor. Further, the internal capacitor within the on-time pulse generator in FIG. 1 is replaced by internal resistor, 204.

Circuit 200 in is similar to the circuit in FIG. 1 in that operates virtually identical to a circuit that uses an external resistor connected to ground. Assuming that the switching frequency at which both circuits in FIG. 1 and FIG. 2 operate is the same, both circuits will obey the same formulas previously discussed and operate in the same manner.

Generally, the switching frequency of programmable frequency DC-DC converter 200 can be set by either an external resistor connected to a voltage, including ground potential, or by external capacitor 202, coupled to ground. As such, a user may choose one design over another to be able to select the type of external component to adjust the switching frequency.

Figure 3:
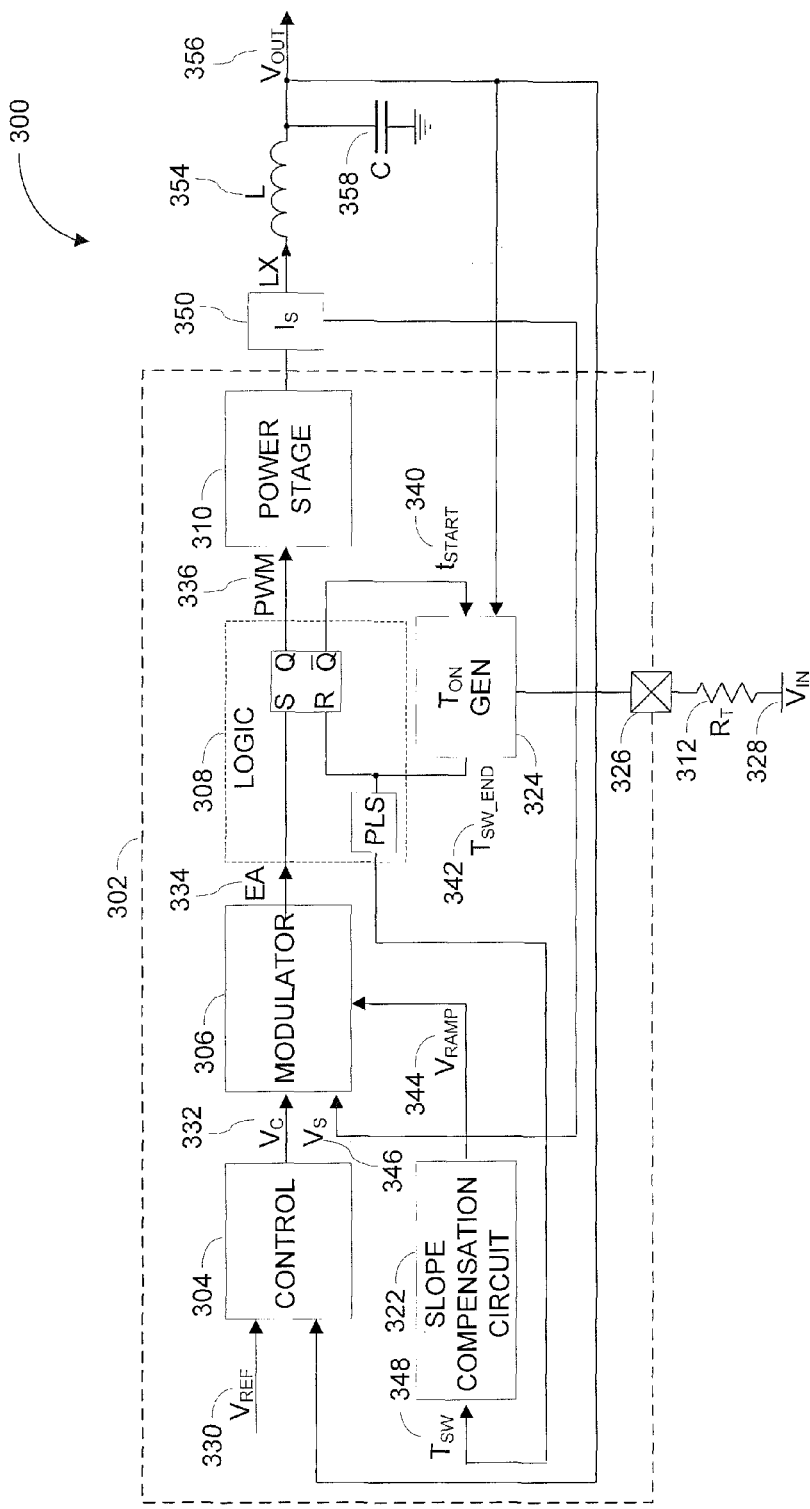
FIG. 3 illustrates an exemplary switching regulator system utilizing slope calibration according to various embodiments of the invention.

FIG. 3 illustrates an exemplary switching regulator system utilizing slope calibration according to various embodiments of the invention. System 300 comprises constant on-time buck regulator 302 coupled to output inductor 354 and output capacitor 358, which generate output voltage 356. Output voltage 356 is coupled to on-time generator 324 and control 304.

On-time generator 324 receives a current from pad 326 that is coupled to one terminal of resistor 312. The other terminal of resistor 312 receives input voltage $V_{IN}$ 328. On-time generator 324 generates signal $T_{SW\_END}$ 342, that is applied to logic device 308, and receives from logic device 308 signal $t_{START}$ 340. Logic device 308, comprises a logic circuit that is configured to generate pulse signal $T_{SW}$ 348 that is then applied to slope compensation circuit 322. In response to receiving pulse signal 348, slope compensation circuit 322, generates ramp signal $V_{RAMP}$ 344 that is applied to modulator 306. Logic device 308 also generates PWM signal 336 that is input to power stage 310. The output current of power stage 310 is input to output inductor 354 via current sensing device $I_S$ 350.

Current sensor 350 is any device comprising active or passive elements, such as a resistor, that detects or measures the current through output inductor 354 and converts the current signal into voltage signal $V_S$ 346 proportional to the inductor current. Modulator 306 is coupled to receive both voltage signal $V_S$ 346 and control voltage signal $V_C$ 332 to generate error signal EA 334, which is input to logic device 308 to adjust PWM signal 336.

External on-time programming resistor $R_T$ 312 may be replaced by a capacitor, e.g., a variable capacitor, to set the switching frequency and, thus, switching period $T_{SW}$ 348, because the absolute value of the external component is not of interest in this example and does not affect the double measurement method employed herein. Rather, what is important for calibration purposes is that the chosen external component enables, in the time domain, the generation of a pulse having a width equal to switching period $T_{SW}$ 348.

As switching period $T_{SW}$ 348 is proportional to the value of the external component, here $R_T$, $T_{SW}$ 348 may subsequently be converted to an absolute value for any purpose. It is understood that in constant off-time architectures, the external component can be used to set the off-time. Further, the settings of the external or internal resistor may be implemented as predetermined discrete intervals that may be chosen, without limitation, as coarse or as fine as desired.

Figure 4:
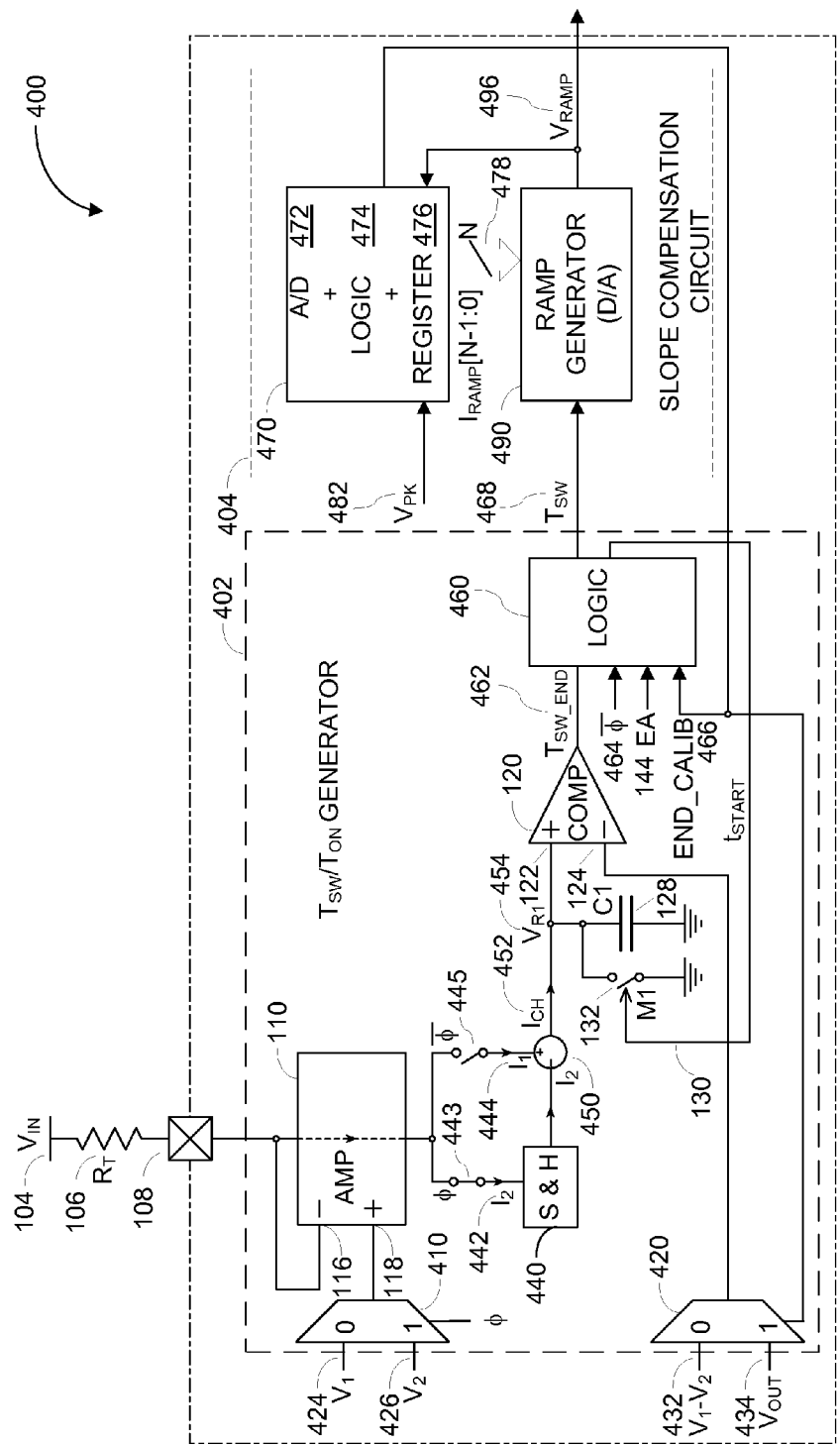
FIG. 4 illustrates one implementation of the switching regulator system in FIG. 3 according to various embodiments of the invention.

FIG. 4 illustrates one implementation of the switching regulator system in FIG. 3 according to various embodiments of the invention. Components similar to those described in previous figures will not be described and their function is not repeated here. Switching regulator 400 comprises on-time pulse generator 402 and slope compensation ramp circuit 404, which may be implemented within the same device.

On-time pulse generator 402 comprises multiplexers 410, 420, amplifier 110, sample and hold circuit 440, summing element 450, comparator 120, capacitor 128, switch 132, and logic device 460. As shown, one terminal of external resistor $R_T$ 106 is connected to pad 108. Pad 108 is connected to an output of amplifier 110. The positive input terminal of amplifier 110 is coupled to multiplexer 410, while the negative input terminal of amplifier 110 is fed back to its output. The output of amplifier 110 is further coupled to both sample and hold circuit 440 and summing element 450 via switch 443 and switch 445, respectively. Sampling and hold circuit 440 is connected to positive input terminal 122 of comparator 120 via summing element 450.

Comparator 120 may be any comparator known in the art. Positive input terminal 122 of comparator 120 is coupled to capacitor 128, which can be implemented as banks of parallel variable capacitors or, as shown, as a single capacitor. One terminal of capacitor 128 is coupled to positive terminal 122 of comparator 120. The other terminal 124 is coupled to ground potential. Capacitor 128 is coupled to switch 132, which is, for example, a MOS switch responsive to feedback signal 130 from logic device 460. The negative input terminal 124 of comparator 120 is coupled to multiplexer 420. The output of comparator 120 is coupled to logic device 460. Logic device 460 is configured to receive a plurality of input signals 464, 144, 466 to generate output signal 468 for slope compensation ramp circuit 404 and feedback signal 130 for switch 132.

Slope compensation ramp circuit 404 comprises ramp generator 490 and acquisition circuit 470. Acquisition circuit 470 may be implemented in many different ways. In one embodiment, acquisition circuit 470 comprises ADC 472, logic device 474, and register 476. ADC 472 is any analog-to-digital converter. Register 476 is configured to store digital data representing the slope of voltage ramp 496. Acquisition circuit 470 is configured to generate signal END_CALIB 466 that is input into logic device 460 and multiplexer 420. Signal END_CALIB 466 triggers logic device 460 to switch circuit 400 into the normal mode of operation. Acquisition circuit 470 is further configured to generate current ramp signal 478, e.g., an N-bit digital word.

Ramp generator 490 is coupled to receive current ramp signal 478 from acquisition circuit 470 and generate a slope compensation voltage ramp signal $V_{RAMP}$ 496. In one embodiment, ramp generator 490 accomplishes this with an N-bit current DAC that drives a current through a capacitor (not shown).

In operation, slope compensation circuit 404 uses acquisition circuit 470 to digitally convert and correct the slope of a compensation voltage ramp to adjust the ramp so as to reach a predetermined peak value within a cycle. Circuit 400 calibrates the slope in a startup auto-calibration phase and then (END_CALIB=1) continues in a normal on-time generation mode similar to prior art designs. In this example, voltages V1 424 and V2 426 are applied, at the inputs of multiplexer 410 and voltages (V1-V2) 432 and $V_{OUT}$ 434 are applied at the inputs of multiplexer 420 to be multiplexed during auto-calibration and normal operation.

During auto-calibration, multiplexer 420 is in the 0 position, such that voltage (V1-V2) 432 is applied to comparator 120 as a reference signal for ramp voltage VR1 454. Conversely, at the end of the calibration phase, a high signal END_CALIB 430 drives multiplexer 420 to assume position 1. During calibration, circuit 402 operates as a switch generator and indirectly "measures" the value of external $R_T$ 106 that sets the switching frequency via the duty cycle. Circuit 402 generates a pulse that emulates the switching period $T_{SW}$ during normal operation.

In detail, the auto-calibration calibration of system 400 operates as follows. Switches 443 and 445 select the appropriate current $I_2$ 442 and $I_1$ 444, respectively, in two phases. In phase one, switch 443 is closed and phase signal ϕ is applied to multiplexer 410, such that first voltage $V_1$ 424 is selected an applied to positive terminal 118 of high-gain feedback amplifier 110. The output of amplifier 110, which acts as a buffer, forces voltage $V_1$ 424 onto pad 108. As a result, current $I_2$ 442 flows through external resistor $R_t$ 106. The value of current $I_2$ 442, given by $$I_2 = \frac{V_{IN} - V_1}{R_T},$$

is stored in sample and hold circuit 440.

In a phase two, phase signal $\bar{\phi}$ opens switch 443 and closes switch 445. Multiplexer 410 switches to the second position to output voltage $V_2$ 426, which is imposed on pad 108 to drive second current $I_1$ 444 given by $$I_1 = \frac{V_{IN} - V_2}{R_T}.$$

$I_2$ 442, which in phase one was stored in sample and hold circuit 440 is now input to summing device 450, which, in this example, subtracts $I_2$ 442 from $I_1$ 445 to generate charging current $I_{CH}$ 452 given by $$I_{CH} = \frac{V_1 - V_2}{R_T}.$$

The difference between the values of currents $I_1$ 445 and $I_2$ 442 can be determined by any method known in the art, for example, via a current mirror. Charging current $I_{CH}$ 452 charges capacitor $C_1$ 128 and generates ramp voltage $V_{R1}$ 454, which is present at positive terminal 122 of comparator 120. On the rising edge of $\bar{\phi}$, switch 132 is turned off and signal $T_{SW}$ 468 switches to a high state, such that capacitor C1 128 is free to be charged by $I_{CH}$ 452 and generate ramp voltage $V_{R1}$ 454.

Once ramp voltage $V_{R1}$ 454 reaches the voltage difference ($V_1$-$V_2$) 432 that is applied the negative terminal 124 by multiplexer 420, comparator output signal $T_{SW\_END}$ 462 switches from a low to a high state. At that time, logic circuit 460 resets the ramp by discharging $C_1$ 128.

Voltage ramp $V_{R1}$ 454, which determines the width of the switching pulse signal $T_{SW}$, is given by $$V_{R1} = \frac{I_{CH}}{C_1}t.$$

Since charging current $I_{CH}$ 452 is inversely proportional to $R_T$ 106, as described previously, signal $T_{SW}$ 468 will represent a pulse width given by $$T_{SW} = R_tC_1.$$

Therefore, the period $T_{SW}$ of the voltage ramp $V_{R1}$ equals the programmed switching period $T_{SW}$ 468 set by the external resistor that circuit 400 will assume in the normal mode of operation.

Ramp generator 490 is configured to receive current ramp signal 478 from acquisition circuit 470. Current signal 478 sets a current $I_{RAMP}$ to a value that generates a current within ramp generator 490 through a current source (not shown). Current $I_{RAMP}$ is used to adjust a slope (mL) of analog output voltage $V_{RAMP}$ 496 to a predetermined threshold voltage $V_{PK}$ 482 for any selected switching frequency $f_{SW}$ within the operating range of switching regulator 400 (e.g. 200 kHz—1 MHz). In one embodiment, the analog current $I_{RAMP}$ charges a capacitor (not shown) giving rise to slope compensation ramp voltage $V_{RAMP}$.

Ramp generator 490 provides voltage ramp information $V_{RAMP}$ 496 to acquisition circuit 470 to digitize $V_{RAMP}$ 496 and compare the digitized value to desired peak voltage value $V_{PK}$ 482 of the slope of $V_{RAMP}$ 496. Acquisition circuit 470 compares, for example, via logic device 474, ramp voltage $V_{RAMP}$ 496 to threshold voltage $V_{PK}$ 482. Based on the digital comparison, acquisition circuit 470 then outputs an updated digital word 478 that sets the current $I_{RAMP}$ to a value that generates an analog current $I_{RAMP}$ aimed at adjusting the slope in a manner such that $V_{RAMP}$ 496 reaches desired $V_{PK}$ 482.

This process is repeated a number of times depending on the type of convergence algorithm that is chosen to adjust $I_{RAMP}$. Convergence is achieved when the peak of $V_{RAMP}$ 496 reaches threshold voltage $V_{PK}$ 482 within the accuracy of the current source. The final binary word $I_{RAMP}$[N−1:0] corresponding to the correct slope is then stored in register 476 that drives the current source in acquisition circuit 470. The algorithm will affect the number of steps necessary to converge. In one embodiment, a 7-bit SAR DAC is used to perform the calibration within a number of iterative steps until $V_{RAMP}$ 496 reaches the desired threshold voltage $V_{PK}$ 482.

After the calibration process is completed, i.e., the slope of $V_{RAMP}$ 496 is adjusted, $V_{OUT}$ 434 is applied to negative terminal 124 of comparator 120, so that circuit 400 enters the normal mode of operation to work in the on-time generator configuration.

Figure 5:
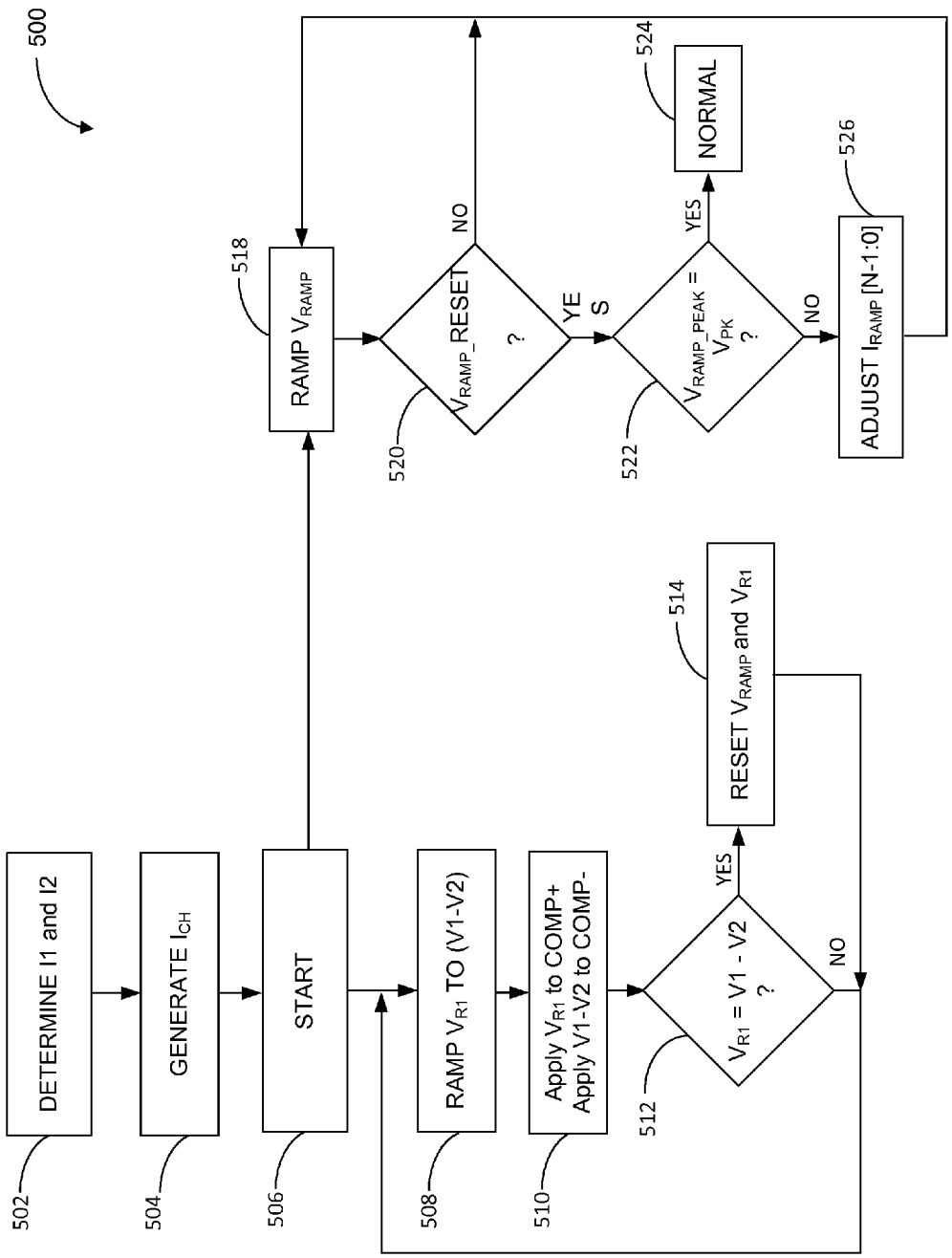
FIG. 5 is a flowchart of an illustrative process for slope compensation in accordance with various embodiments of the invention.

FIG. 5 is a flowchart of an illustrative process for slope compensation in accordance with various embodiments of the invention.

The slope compensation process starts at step 502 when currents $I_1$ and $I_2$ are determined. This may occur in two different phases, where one current is stored, for example, in a sample and hold the device while the other current is being determined.

At step 504, a charging current $I_{CH}$ is generated from currents $I_1$ and $I_2$.

At step 506, two separate steps are started. First, at step 508, a voltage $V_{R1}$ starts to ramp to a predetermined value, such as $V_1-V_2$. Voltage $V_{R1}$ is applied to the positive and negative inputs of a comparator, at step 510.

At step 512, it is determined whether voltage $V_{R1}$ equals the predetermined value $V_1-V_2$. If so, the process continues with step 514, in which both ramp voltages $V_{R1}$ and $V_{RAMP}$ are reset, and the process returns to step 508 to initiate a new ramp of voltage $V_{R1}$. If $V_{R1}$ does not equal the predetermined value, the process returns to step 508, without resetting either $V_{R1}$ or $V_{RAMP}$.

At step 506, a second step is started, step 518, at which $V_{RAMP}$ is ramped up.

At step 520, it is determined whether $V_{RAMP}$ was reset. If not, the process returns to step 518 to continue to ramp $V_{RAMP}$.

If however $V_{RAMP}$ was reset, then, at step 522, it is determined whether the peak of the ramp voltage $V_{RAMP}$ is equal to a predetermined peak voltage $V_{PK}$.

If so, the process enters a normal mode of operation in step 524.

Otherwise, at step 526, the ramp current is digitally adjusted to calibrate the ramp voltage $V_{RAMP}$ to more closely approximate $V_{PK}$, for example, in a subsequent cycle.

It will be appreciated by those skilled in the art that fewer or additional steps may be incorporated with the steps illustrated herein without departing from the scope of the invention. No particular order is implied by the arrangement of blocks within the flowchart or the description herein.

Figure 6:
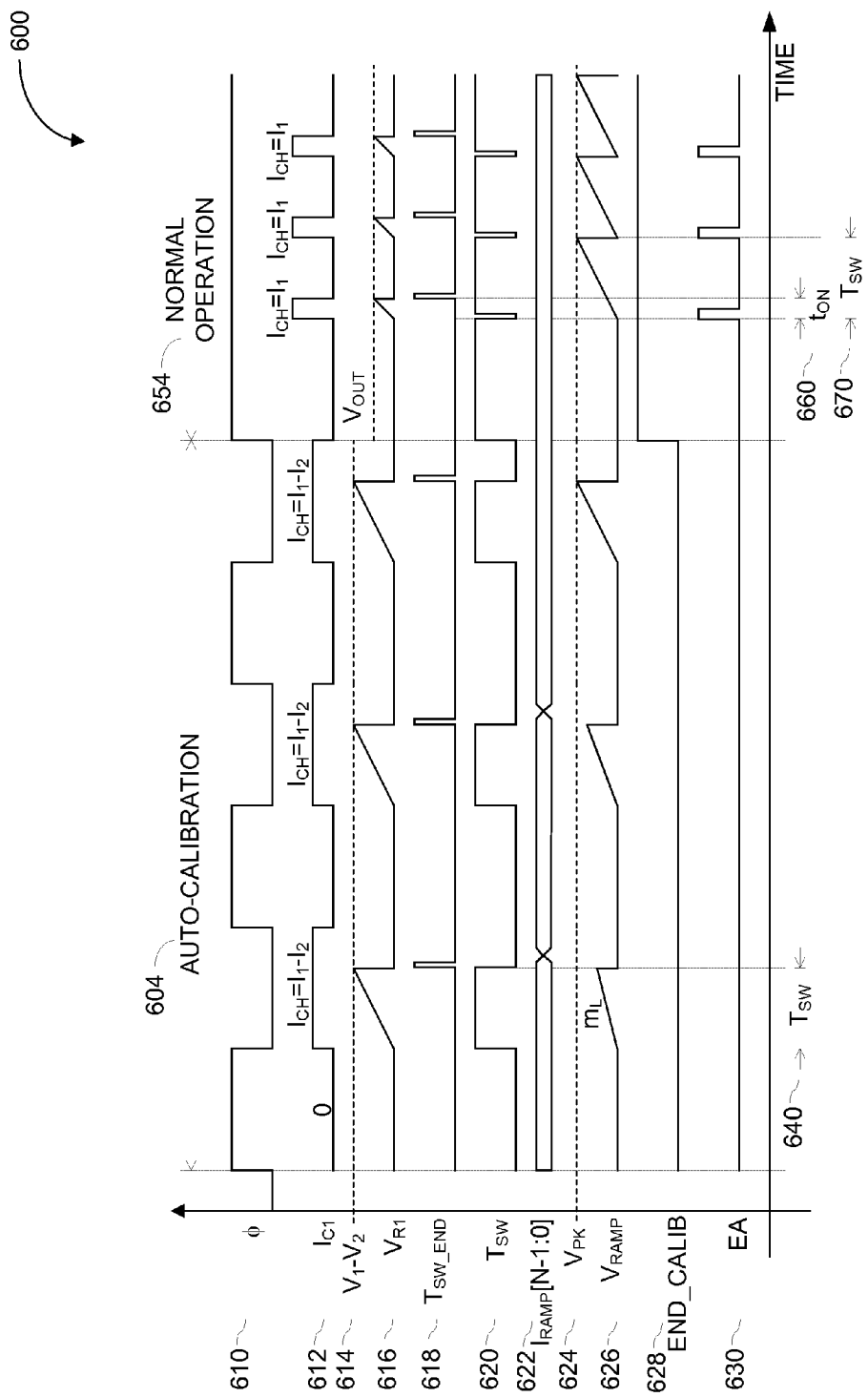
FIG. 6 is an exemplary waveform diagram of the system in FIG. 3 according to various embodiments of the invention.

FIG. 6 is an exemplary waveform diagram of the system in FIG. 3 according to various embodiments of the invention. As shown in FIG. 6, during auto-calibration phase 604, slope calibration of voltage ramp signal 626 is achieved in three iterations. During auto-calibration phase 604, signal $T_{SW}$ 620 has a width 640 equal to that of the programmed switching period $T_{SW}$ 670, while in normal operation 654 signal $T_{SW}$ 620 is the inverse of a short reset pulse that repeats at the beginning of each switching period. In the calibration phase 604, the duration of ramp signal $V_{R1}$ 616 determines the width 640 of signal $T_{SW}$ 620. In normal operation, the width of ramp signal $V_{R1}$ 616 is equal to the programmed on-time $t_{ON}$ 660. Since signal $T_{SW}$ 620 also determines the period of $V_{RAMP}$ 626, switching period $T_{SW}$ 640 generates during auto-calibration phase 604 is exactly the same as the programmed switching period $T_{SW}$ 670 during normal operation 654.

It will be appreciated that the preceding examples and embodiments are exemplary and are for the purposes of clarity and understanding and not limiting to the scope of the present invention. It is intended that all permutations, enhancements, equivalents, combinations, and improvements thereto that are apparent two those skilled in the art, upon a reading of the specification and a study of the drawings, are included within the scope of the present invention. It is therefore intended that the claims include all such modifications, permutations, and equivalents as fall within the true spirit and scope of the present invention.

We claim:

1. A switching regulator comprising:
    a pulse generator to generate a first ramp voltage that ramps to a first predetermined voltage within a ramp time in a calibration phase; and
    a slope compensation circuit coupled to the pulse generator, the slope compensation circuit calibrates a slope of a second ramp voltage to reach within the ramp time a peak voltage that is maintained during regular operation, the ramp time being equal to the switching period of the switching regulator.

2. The switching regulator according to claim 1, further comprising:
    a first switch responsive to a first phase signal;
    a second switch responsive to a second phase signal;
    a sample and hold circuit coupled to the first switch, the sample and hold circuit receives and stores a first current signal; and
    a combiner circuit coupled to receive both the first current signal from the sample and hold circuit and a second current signal via the second switch, the combiner outputs a difference current signal.

3. The switching regulator according to claim 2, wherein the second phase signal is an inverse of the first phase signal.

4. The switching regulator according to claim 2, further comprising a multiplexer configured to output the first predetermined voltage.

5. The switching regulator according to claim 4, further comprising a comparator coupled to receive the first predetermined voltage and the first ramp voltage to generate a comparator output signal in response to detecting that the first predetermined voltage equals the first ramp voltage.

6. The switching regulator according to claim 5, further comprising a first logic device coupled to the comparator, wherein the first logic device generates a feedback signal and a switching control signal in response to receiving the comparator output signal.

7. The switching regulator according to claim 2, wherein the slope compensation circuit comprises a current source configured to generate a second charging current.

8. The switching regulator according to claim 2, wherein the slope compensation circuit further comprises an acquisition circuit coupled to receive the peak voltage and the second ramp voltage, the acquisition circuit is configured to either adjust a digital current ramp signal in response to detecting a difference value between the second voltage ramp and the peak voltage or trigger an end-of-calibration signal to enter a normal mode of operation.

9. The switching regulator according to claim 8, further comprising a ramp generator, the ramp generator is coupled to generate the second ramp voltage in response to receiving the digital current ramp signal.

10. A slope compensation method to calibrate a regulator, the method comprising:
- in a calibration phase, ramping a first voltage to a first predetermined voltage using a first charging current; and
- ramping a second ramp voltage using a digital current ramp signal;
- detecting a difference value between the second ramp voltage and a peak voltage; and
- if the difference value is greater than a third predetermined value, adjusting the digital current ramp signal to calibrate a slope of the second ramp voltage, a ramp time of the of the second ramp voltage being equal to the switching period of the regulator.

11. The slope compensation method according to claim 10, wherein the peak value is independent of the switching period of the regulator.

12. The slope compensation method according to claim 10, wherein the first predetermined voltage is the difference between two constant voltages.

13. The slope compensation method according to claim 10, further comprising determining whether the first voltage equals the first predetermined voltage.

14. The slope compensation method according to claim 13, further comprising resetting the first voltage and the second ramp voltage in response to determining that the first voltage equals the first predetermined voltage.

15. The slope compensation method according to claim 10, further comprising determining whether the second ramp voltage was reset.

16. The slope compensation method according to claim 10, further comprising:
- in a first phase of operation, determining and storing a first current; and
- in a second phase of operation, combining the first current with a second current to produce the first charging current.

17. A switching regulator system comprising:
- a resistive element coupled to receive an unknown voltage;
- an amplifier comprising an output terminal and an input terminal, the output terminal is coupled to the resistive element;
- first and second switches coupled to the output terminal, the first and second switches are responsive to first and second phase signals, respectively;
- a sample and hold circuit coupled to the first switch, the sample and hold circuit receives and stores a first current signal;
- a combiner circuit coupled to receive both the first current signal from the sample and hold circuit and a second current signal via the second switch, wherein the combiner circuit outputs a difference current signal;
- a pulse generator to generate a first ramp voltage that ramps to a first predetermined voltage within a ramp time; and
- a slope compensation circuit coupled to the pulse generator, the slope compensation circuit adjusts a slope of a second ramp voltage to reach a second predetermined voltage within the ramp time.

18. The switching regulator system according to claim 17, wherein the difference current signal is inversely proportional to a resistance.

19. The switching regulator system according to claim 18, wherein the resistance is implemented as an external resistor.

20. The switching regulator system according to claim 17, wherein the pulse generator further comprises:
- a first capacitor coupled to receive the difference current signal to generate the first ramp voltage,
- a third switch coupled to the first capacitor, the third switch discharges the first capacitor in response to a feedback signal; and
- a fourth switch coupled to a second capacitor within the slope compensation circuit, the fourth switch discharges the second capacitor in response to a switching control signal.

* * * * *